(12) United States Patent
Mizunaka

(10) Patent No.: US 11,443,415 B2
(45) Date of Patent: Sep. 13, 2022

(54) INSPECTION METHOD, COMPUTER-READABLE RECORDING MEDIUM, AND REFERENCE STANDARD PLATE

(71) Applicant: OLYMPUS CORPORATION, Tokyo (JP)

(72) Inventor: Masaru Mizunaka, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 17/142,703

(22) Filed: Jan. 6, 2021

(65) Prior Publication Data

US 2021/0209743 A1 Jul. 8, 2021

(30) Foreign Application Priority Data

Jan. 7, 2020 (JP) .............................. JP2020-000657

(51) Int. Cl.
*H04N 7/18* (2006.01)
*G06T 7/00* (2017.01)
*H04N 17/00* (2006.01)

(52) U.S. Cl.
CPC ......... *G06T 7/0002* (2013.01); *H04N 17/002* (2013.01); *G06T 2207/30242* (2013.01)

(58) Field of Classification Search
CPC ...... H04N 17/002; H04N 7/18; G06T 7/0002; G06T 2207/30242; G06T 7/11; C12M 1/34; C12M 1/26; C12M 1/00; C12M 1/06

USPC .................................................. 348/187, 135
See application file for complete search history.

(56) References Cited

U.S. PATENT DOCUMENTS

| 4,741,043 A * | 4/1988 | Bacus ................ G01N 15/1468 348/135 |
| 9,388,376 B2 * | 7/2016 | Suenaga ................ C12M 41/40 |
| 9,709,874 B2 * | 7/2017 | Ushijima ............... G03B 13/36 |
| 2010/0261811 A1 | 10/2010 | Thomas |
| 2014/0162280 A1 | 6/2014 | Roggenbuck |

FOREIGN PATENT DOCUMENTS

| JP | H07-146289 A | 6/1995 |
| JP | 2011-503532 A | 1/2011 |
| JP | 5894664 B | 3/2016 |
| JP | 2017-097227 A | 6/2017 |

* cited by examiner

*Primary Examiner* — Trang U Tran
(74) *Attorney, Agent, or Firm* — Scully, Scott, Murphy & Presser, P.C.

(57) ABSTRACT

An inspection method for inspecting a counting function of an imaging system that captures an image of a phase object includes: capturing an image of a reference standard plate that includes a base region and a plurality of counting target regions having a phase amount in a thickness direction different from a phase amount of the base region, under a condition where the number of counting target regions positioned within a field of view of the imaging system is specified among the plurality of counting target regions; counting the counting target regions included in the captured image of the reference standard plate; and outputting at least a counted result of the counting target regions.

16 Claims, 18 Drawing Sheets

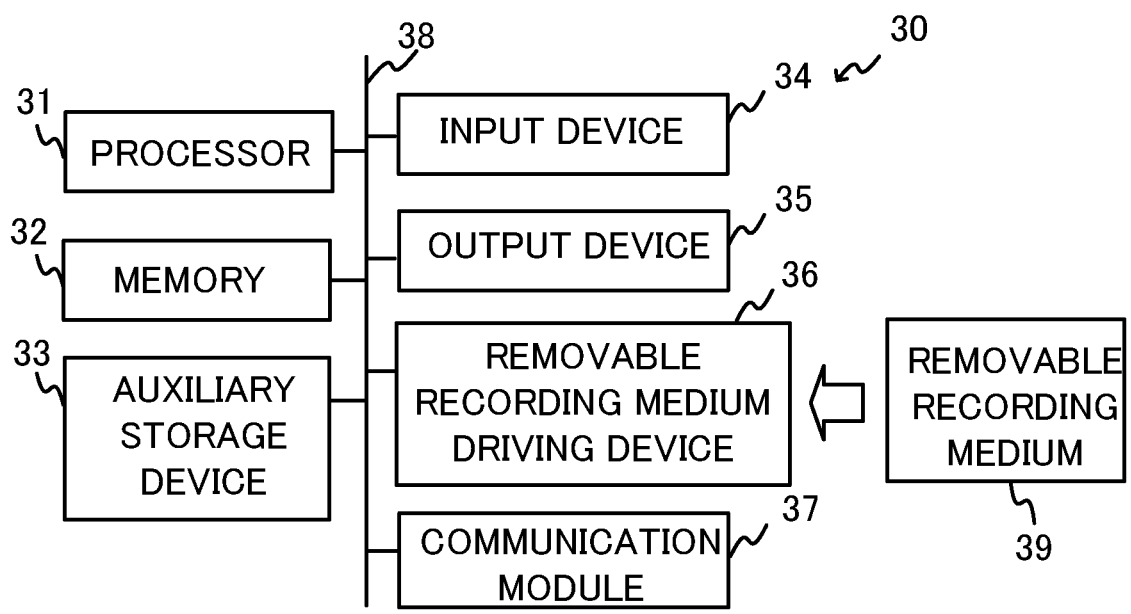
F I G. 3

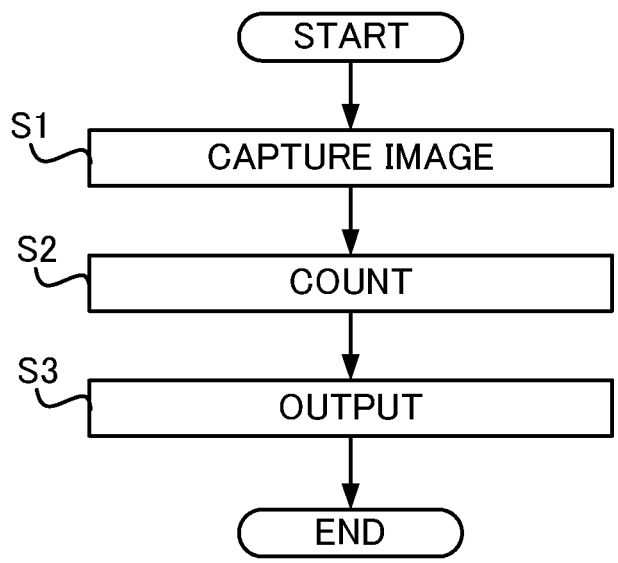
F I G. 4

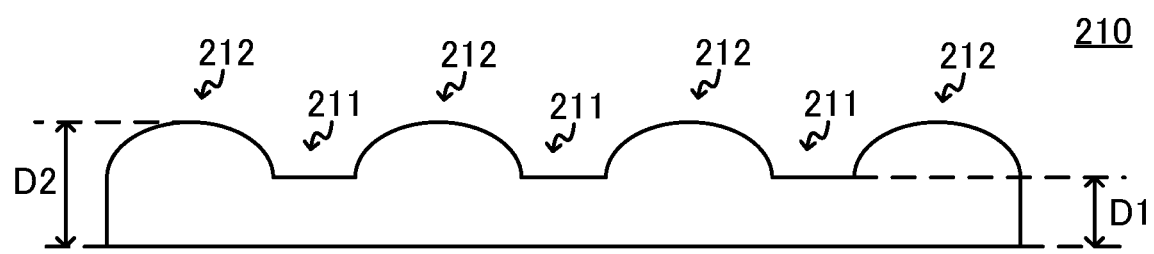
F I G. 8

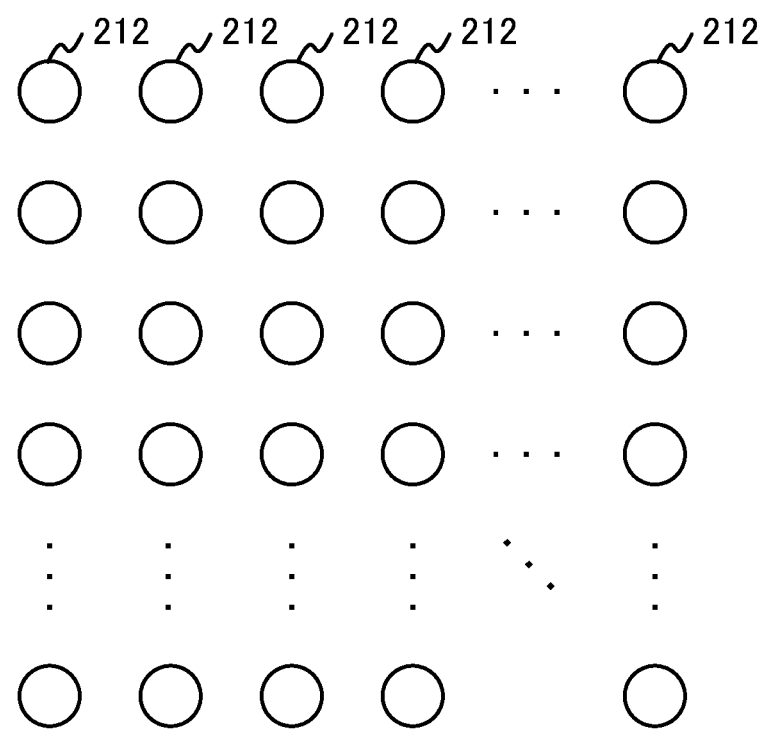
F I G. 9

| Analysis Count | Mean | CV[%] | Std | Error Bound[%] | OK/NG |
|---|---|---|---|---|---|
| REFERENCE STANDARD PLATE 210 | 2029.1 | 2.52 | 51.28 | 4.70 | OK |
| REFERENCE STANDARD PLATE 220 | 1008.9 | 0.88 | 8.86 | 3.79 | OK |
| REFERENCE STANDARD PLATE 230 | 530.5 | 0.81 | 1.02 | 26.19 | NG |
| REFERENCE STANDARD PLATE 240 | 320 | 3.76 | 12.04 | 10.0 | OK |

T1

| Analysis Confluency | Mean [%] | CV[%] | Std | Error Bound[%] | OK/NG |
|---|---|---|---|---|---|
| REFERENCE STANDARD PLATE 310 | 29.82 | 0.29 | 0.088 | 9.31 | OK |

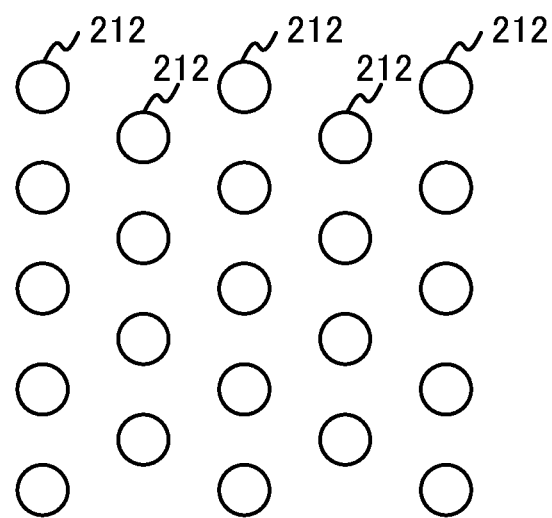
F I G. 1 4

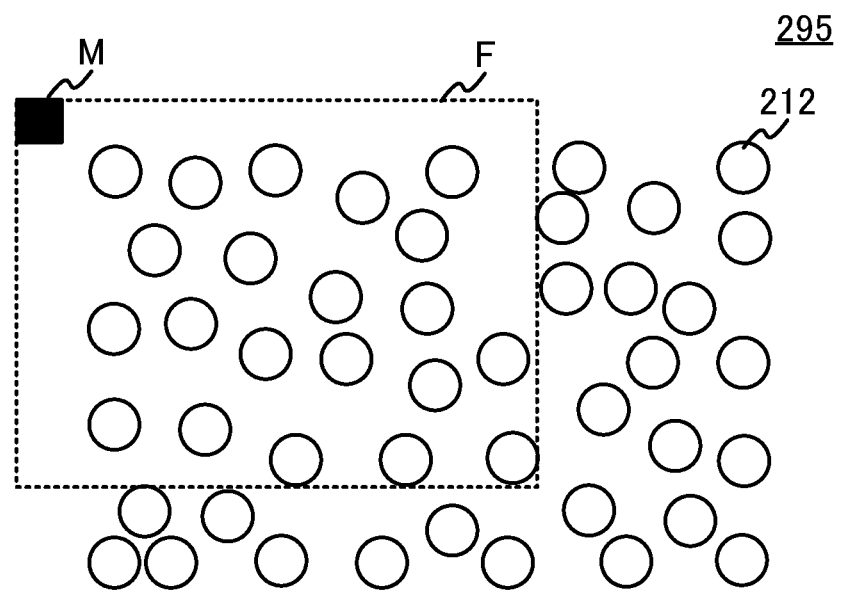
F I G. 17

INSPECTION METHOD, COMPUTER-READABLE RECORDING MEDIUM, AND REFERENCE STANDARD PLATE

CROSS REFERENCE TO RELATED APPLICATIONS

This application is based upon and claims the benefit of priority from prior Japanese Patent Application No. 2020-000657, filed Jan. 7, 2020, the entire contents of which are incorporated herein by this reference.

BACKGROUND OF THE INVENTION

Field of the Invention

The present disclosure of the Specification relates to an inspection method, a computer-readable recording medium, and a reference standard plate.

Description of the Related Art

As known cell counting methods, there are a method of counting cells by a human by using a cell counter, a method of counting cells flowed in line by using a flow cytometer, a method of counting cells from an image by analyzing the image of the cells, and the like. The method of counting cells from an image can be performed even during culture, so that it is preferable to be used for monitoring the culture state by counting the cells during culture, or the like.

Conventionally, there have been proposed various techniques for correctly counting cells from an image. For example, Japanese Patent Laid-Open No. 2017-097227 discloses a technique that adjusts a threshold value of a frequency region of a bandpass filter so as to suppress counting errors caused by misrecognizing noises contained in the image as cell nucleuses.

SUMMARY OF THE INVENTION

An inspection method according to an aspect of the present invention is an inspection method for inspecting a counting function of an imaging system that captures an image of a phase object, the inspection method including: capturing an image of a reference standard plate that includes a base region and a plurality of counting target regions having a phase amount in a thickness direction different from a phase amount of the base region, under a condition where the number of counting target regions positioned within a field of view of the imaging system is specified among the plurality of counting target regions; counting the counting target regions included in the captured image of the reference standard plate; and outputting at least a counted result of the counting target regions.

A computer-readable recording medium according to an aspect of the present invention is a computer-readable recording medium recording a program for inspecting a counting function of an imaging system that captures an image of a phase object, the computer-readable recording medium causing a computer of the imaging system to execute processing of: causing an imaging device of the imaging system to capture an image of a reference standard plate that includes a base region and a plurality of counting target regions having a phase amount in a thickness direction different from a phase amount of the base region, under a condition where the number of counting target regions positioned within a field of view of the imaging system is specified among the plurality of counting target regions; counting the counting target regions included in the captured image of the reference standard plate; and outputting at least a counted result of the counting target regions.

A reference standard plate according to an aspect of the present invention is a reference standard plate used for inspecting a counting function of an imaging system that captures an image of a phase object, the reference standard plate including: a base region formed of a phase object; and a plurality of counting target regions formed of phase objects, the plurality of counting target regions having a phase amount in a thickness direction different from a phase amount of the base region, wherein the plurality of counting target regions are regularly arranged within the reference standard plate.

BRIEF DESCRIPTION OF THE DRAWINGS

FIG. 3 is a diagram illustrating an example of a configuration of a control device;

FIG. 4 is an example of a flowchart of an inspection method executed by the imaging system;

FIG. 8 is a schematic sectional view of the reference standard plate illustrated in FIG. 7;

FIG. 9 is a schematic top view of the reference standard plate illustrated in FIG. 7;

FIG. 11 illustrates tables as examples of output information of the control device;

FIG. 14 is a schematic top view illustrating another example of the reference standard plate for inspecting the counting function;

FIG. 17 is a schematic top view illustrating a still further example of the reference standard plate for inspecting the counting function.

DETAILED DESCRIPTION OF THE PREFERRED EMBODIMENTS

The technique disclosed in Japanese Patent Laid-Open No. 2017-097227 is a technique that correctly counts cells by suppressing the influence of noises included in images, so that it is considered to improve the quality of the images for analysis afterward. As described, the quality of the image is important for appropriately counting the target. However, in capturing images of phase objects such as cells, the quality of the images may greatly vary depending the lighting conditions, for example. If the lighting condition is inappropriate, acquired are the images of low quality. Thus, images of sufficient quality cannot be expected even if the technique disclosed in Japanese Patent Laid-Open No. 2017-097227 is applied to suppress the influence of the noises contained in the images. Thus, desired is a technique that secures the reliability of the counting system by checking in advance that it is possible to acquire appropriate images.

Considering such circumstances, an embodiment of the present invention will be described hereinafter.

The imaging system herein is a system that captures images of phase objects, and mainly used in the biology field that handles cells and the like, for example. This imaging system has at least a function of counting target phase objects included in images. Thus, the imaging system can be used in a case where an image of cultured cells cultured in a controlled environment in an incubator is acquired, and whether the culture state is good or poor is grasped from the number of cultured cells (the number of cells) counted based on the image, for example. Note that the imaging system may further have a function of measuring an area ratio (referred to as confluency hereinafter) of the phase object occupying the image. Note that the phase objects as the counting target are not limited to cells, but an aggregation of cells may be counted. For example, bacteria (more strictly, a colony of bacterial cells) may be counted, or a cell colony of cells other than the bacterial cells may be counted.

Figure 1:
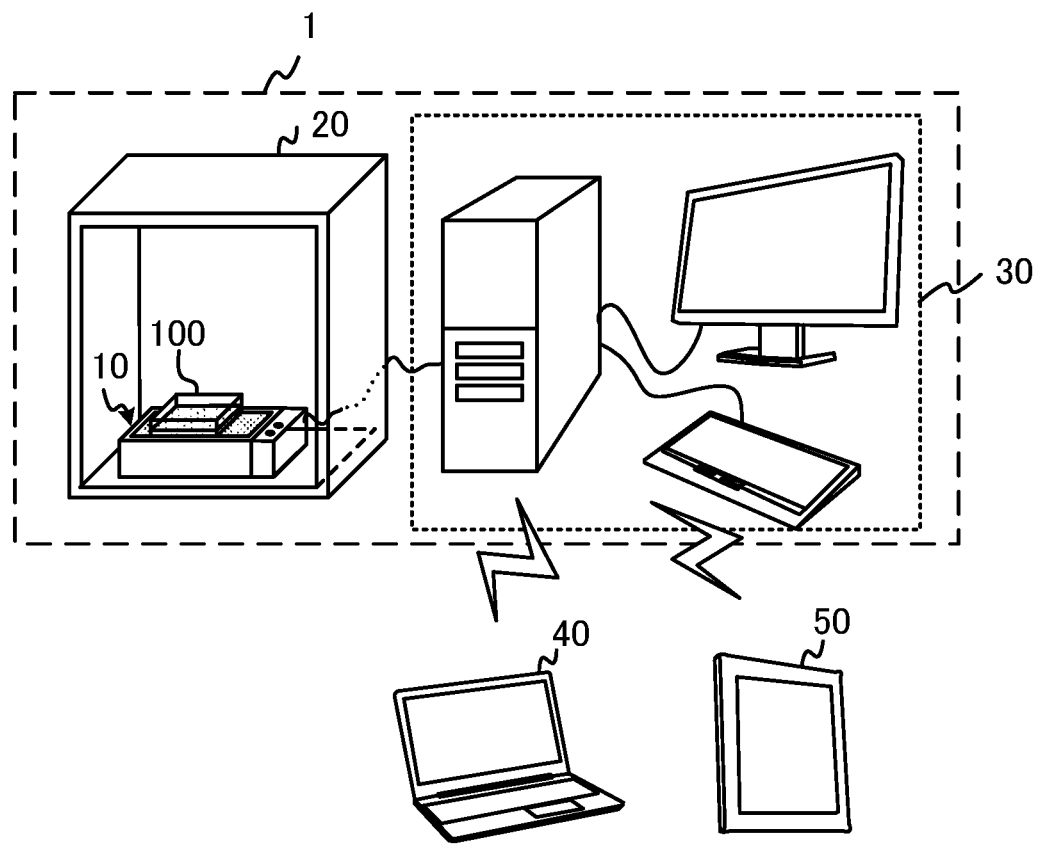
FIG. 1 is a diagram illustrating an example of a configuration of an imaging system.
Figure 2:
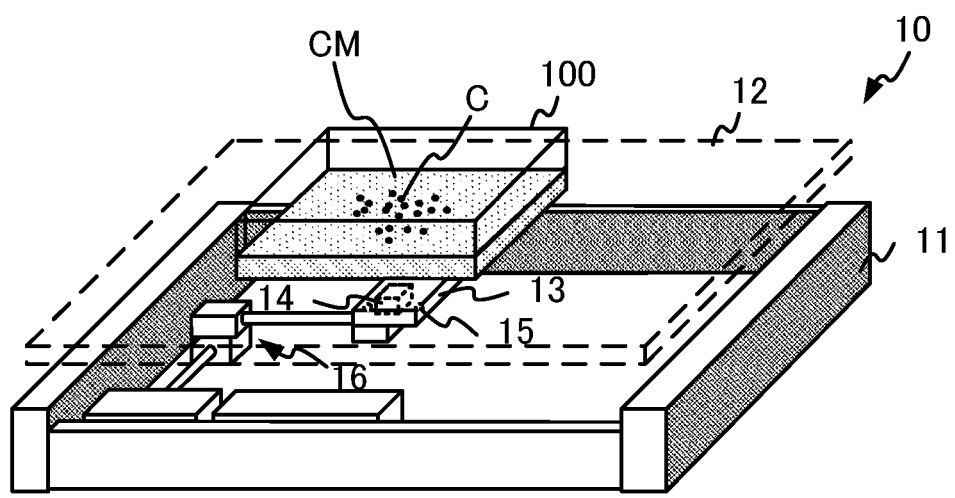
FIG. 2 is a diagram illustrating an example of a configuration of an imaging device.

FIG. 1 is a diagram illustrating an example of a configuration of an imaging system. FIG. 2 is a diagram illustrating an example of a configuration of an imaging device. FIG. 3 is a diagram illustrating an example of a configuration of a control device. Hereinafter, the configuration of the imaging system 1 illustrated in FIG. 1 will be described by referring to FIG. 1 to FIG. 3.

As illustrated in FIG. 1, the imaging system 1 includes an imaging device 10 placed in an incubator 20, and a control device 30. In the imaging system 1, the control device 30 counts cells based on an image acquired by the imaging device 10, and assists the user to monitor cell culture by using the acquired cell number. Further, the control device 30 can execute an inspection program of the imaging system 1 before starting cultivation, for example, and output the acquired inspection result to check whether or not a counting function of the imaging system 1 is working properly, thereby helping to secure the reliability of the counting function. Further, the control device 30 communicates with the imaging device 10 and client terminals (a client terminal 40, a client terminal 50). Note that the imaging system 1 may include the incubator 20 and the client terminals.

As illustrated in FIG. 1, a culture vessel 100 is placed on the imaging device 10 that is disposed within the incubator 20. While not specifically limited, the culture vessel 100 is a petri dish, a flask, or a microplate, for example. As illustrated in FIG. 2, in the culture vessel 100, cells C as culture cells are housed along with a culture medium CM. Note that, while not specifically limited, the culture medium CM is a solution containing calf serum or the like, for example, and the cells C are mesenchymal stem cells or iPS cells, for example.

The imaging device 10 acquires an image of the cells C (referred to as a cell image hereinafter) by capturing an image of the cells C housed in the culture vessel 100. The imaging device 10 transmits the acquired image to the control device 30. Communication between the imaging device 10 and the control device 30 may be wired communication or wireless communication. The observation method the imaging device 10 performs for acquiring the images may be any methods suited for observing phase objects such as cells, and examples thereof may be any one selected from a phase-contrast observation method, a differential interference contrast observation method, an oblique illumination observation method, a bright-field observation method, and a dark-field observation method.

More specifically, as illustrated in FIG. 2, the imaging device 10 includes a casing 11 and a stage 12 on which the culture vessel 100 is placed. The imaging device 10 further includes, inside the casing 11 underneath the stage 12, an imaging unit 13, a scanning mechanism 16 that moves the imaging unit 13, and a control substrate, not illustrated, for controlling the imaging unit 13 and the scanning mechanism 16. In the imaging unit 13, an imaging element 14, a light source 15, an optical system (not illustrated), and the like are provided.

Examples of the imaging element 14 may be a CCD (Charge-Coupled Device) image sensor and a CMOS (Complementary MOS) image sensor. The light source 15 may be a light emitting diode (LED), or the like, for example, and illuminates the culture vessel 100 from the underneath of the stage 12. The light source 15 may be placed in a face-to-face manner with the imaging element 14 sandwiched therebetween. Further, the light source 15 may emit white light. The light source 15 may selectively emit light of any of wavelengths R (red), G (green), and B (blue) by switching the light of wavelengths of three colors R (red), G (green), and B (blue), for example. In the imaging device 10, the light emitted from the light source 15 transmits through the bottom face of the culture vessel 100, and part of the light reflected at the top surface of the culture vessel 100 transmits through the cells C inside the culture vessel 100. The optical system forms an optical image of the cells C on the imaging element 14 by using the light transmitted through the cells C inside the culture vessel 100.

Under control of the control substrate, the scanning mechanism 16 moves the imaging unit 13 in directions (XY directions) orthogonal to the optical axis of the optical system. By the scanning mechanism 16 moving the imaging unit 13 in the XY directions, the imaging device 10 can change the imaging range (that is, the field of view of the imaging system 1). The scanning mechanism 16 may further move the imaging unit 13 in the optical axis direction (Z direction) of the optical system, and the imaging device 10 may adjust the focus position by driving the entire optical system by using the scanning mechanism 16. The scanning mechanism 16 is a motor inside the imaging unit 13, for example. Further, the imaging device 10 may adjust the focus position by moving at least one of lenses included in the optical system in the optical axis direction. Further, instead of moving the lens, the focus position may be adjusted by using a varifocal lens in which the shape of the lens can be changed. The control substrate may include a specifically-designed electric circuit such as ASIC (Application Specific Integrated Circuit) or the like, for example. The control substrate may alternatively be configured by using FPGA (Field-Programmable Gate Array).

The control device 30 is a computer that controls the imaging system 1. As illustrated in FIG. 3, the control device 30 includes a processor 31, a memory 32, an auxiliary storage device 33, an input device 34, an output device 35, a removable recording medium driving device 36 that drives a removable recording medium 39, a communication module 37, and a bus 38. Each of the auxiliary storage device 33 and the removable recording medium 39 is an example of a non-transitory computer-readable recording medium having a program recorded therein.

The processor 31 is an electric circuit (circuitry) including a CPU (Central Processing Unit), a GPU (Graphics Processing Unit), and the like, for example. The processor 31 loads the program stored in the auxiliary storage device 33 or the removable recording medium 39 on the memory 32 and then executes it to perform processing programmed in advance.

The memory 32 is an arbitrary semiconductor memory such as a RAM (Random Access memory), for example. The memory 32 functions as a work memory that stores the program or the data stored in the auxiliary storage device 33 or the removable recording medium 39 when the program is executed. The auxiliary storage device 33 is a nonvolatile memory such as a hard disk or a flash memory, for example. The auxiliary storage device 33 is mainly used for storing various kinds of data and programs.

The removable recording medium driving device 36 houses the removable recording medium 39. The removable recording medium driving device 36 can output the data stored in the memory 32 or the auxiliary storage device 33 to the removable recording medium 39, and can read out the programs and the data from the removable recording medium 39. The removable recording medium 39 is an arbitrary recording medium that can be carried. Examples of the removable recording medium 39 may be an SD card, a USB (Universal Serial Bus) flash memory, a CD (Compact Disc), and a DVD (Digital Versatile Disc).

The input device 34 is a keyboard, a mouse, or the like. The output device 35 is a display device, a printer, or the like. The communication module 37 is a wired communication module that communicates with the imaging device 10 connected via an external port, for example. Note that the communication module 37 may also be a wireless communication module. The bus 38 connects the processor 31, the memory 32, the auxiliary storage device 33, and the like to be able to exchange data mutually.

The configuration illustrated in FIG. 3 is an example of the hardware structure of the control device 30. The control device 30 is not limited to such a configuration. The control device 30 may be a general-purpose device or may be a dedicated device. The control device 30 may include, for example, a specifically-designed electric circuit such as an ASIC (Application Specific Integrated Circuit), or the like. Further, the control device 30 may be configured by using an FPGA (Field-Programmable Gate Array).

The client terminal 40 is a laptop computer, for example. The client terminal 50 is a tablet computer, for example. Note that the client terminal can also function as the input device 34 and the output device 35, so that the input device 34 and the output device 35 may not have to be included in the control device 30. Information may be input to the control device 30 in response to a request from the client terminals (the client terminal 40 and the client terminal 50), and the control device 30 may output information to the client terminals in response to a request from the client terminals. The client terminal may simply need to include a display unit that displays information received from the control device 30, and examples thereof may be a desktop computer and a smartphone.

In the imaging system 1 configured in the manner described above, while culturing the cells C, for example, the control device 30 transmits an imaging instruction to the imaging device 10. The imaging device 10 captures an image of the cells according to the instruction from the control device 30, and transmits the acquired image to the control device 30. The control device 30 receives the image from the imaging device 10, and counts the cells C included in the image based on the received image to calculate the number of cells. Further, the cell confluency that is the area ratio of the cells C occupying the image may be measured based on the received image.

Note that counting processing based on the image may be performed by using a learned model or the like trained by deep learning. In that case, the control device 30 may selectively use a plurality of learned models according to characteristics of counting targets. Specifically, the control device 30 may switch and use the learned models according to the size or kinds of the cells as the counting target, for example. Similarly, confluency measuring processing based on the image may also be performed by using a learned model trained by deep learning or the like.

The control device 30 reports the cultured state to the user based on the number of cells. Specifically, the control device 30 may display the transition of the number of cells through the output device 35, for example, or may display whether the cultured state identified based on the number of cells or the transition of the number of cells is good or poor through the output device 35. Further, instead of displaying information, the control device 30 may transmit the information to the terminal of the user by an e-mail or the like. Further, the control device 30 may report the cultured state to the user based on the number of cells and the confluency of the cells. As a reporting method, for example, push notification or the like may be used. This makes it possible for the user to grasp abnormality occurring in the cultured state at an early stage. Further, it is possible to grasp the cultured state even if the user is at a place distant from the culturing place.

Further, an inspection program for securing the reliability of the counting function of the imaging system 1 is mounted on the imaging system 1. The inspection program may be executed by the control device 30 before the imaging system 1 is being shipped, for example, and further may be executed by the control device 30 at the initial introduction of the imaging system 1 at the shipping destination. Further, the inspection program may be executed by the control device 30 at an arbitrary timing according to an instruction of the user.

Figure 5:
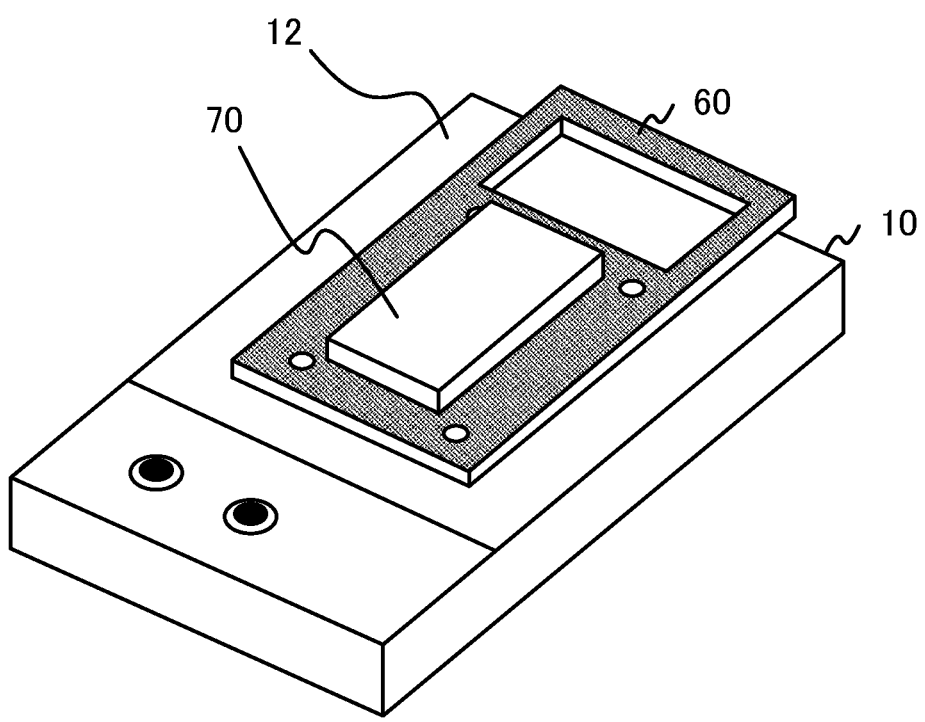
FIG. 5 is a diagram for describing a jig used in an inspection of the imaging system.
Figure 6:
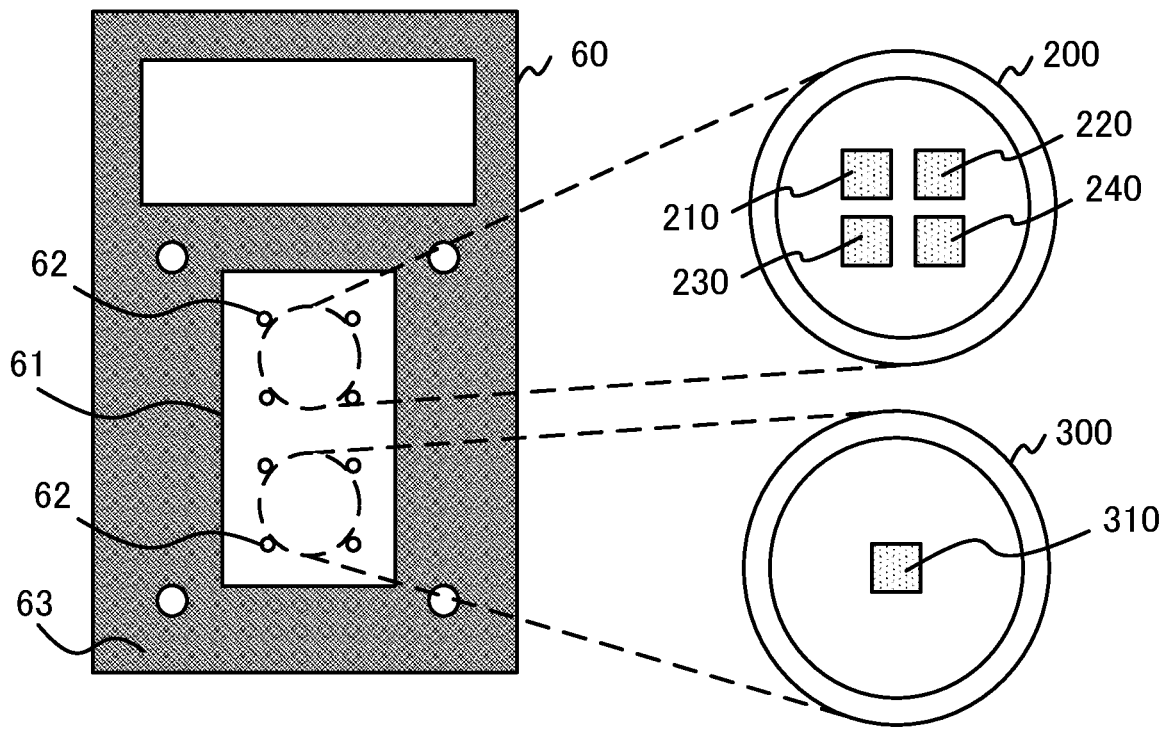
FIG. 6 is a diagram illustrating an example of layout of reference standard plates in an inspection of the imaging system.
Figure 7:
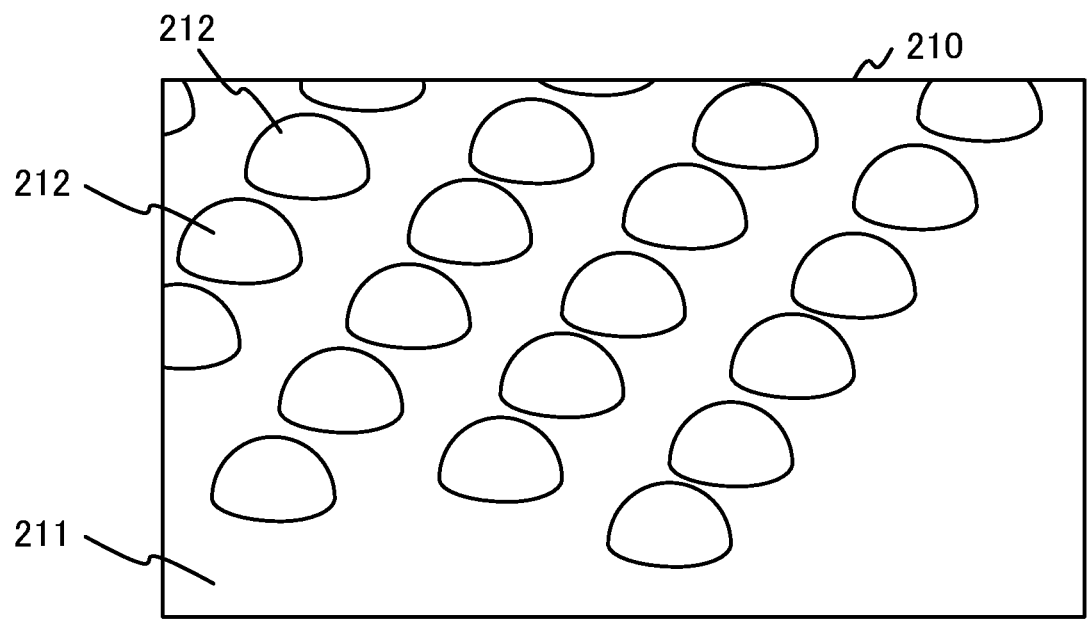
FIG. 7 is a perspective view illustrating an example of the reference standard plate for inspecting a counting function.
Figure 10:
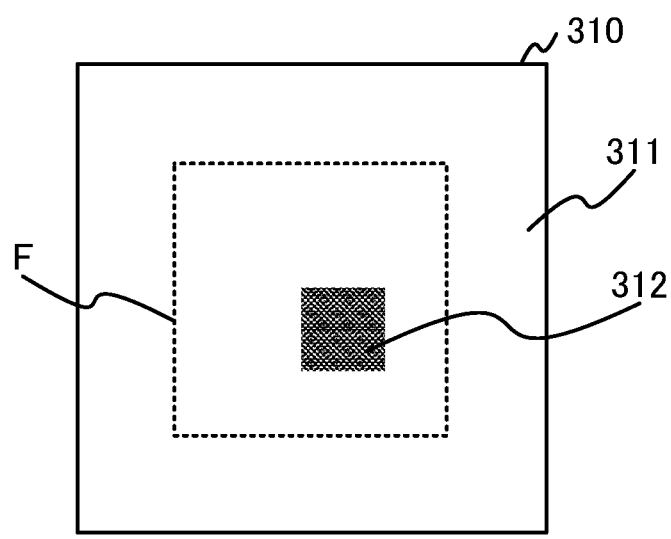
FIG. 10 is a schematic top view illustrating an example of a reference standard plate for inspecting a confluency measuring function.

FIG. 4 is an example of a flowchart of the inspection method performed by the imaging system. FIG. 5 is a diagram for describing a jig used in the inspection of the imaging system. FIG. 6 is a diagram illustrating an example of layout of the reference standard plates in the inspection of the imaging system. FIG. 7 is a perspective view illustrating an example of the reference standard plates for inspecting the counting function. FIG. 8 is a schematic sectional view of the reference standard plate illustrated in FIG. 7. FIG. 9 is a schematic top view of the reference standard plate illustrated in FIG. 7. FIG. 10 is a schematic top view illustrating an example of a reference standard plate for inspecting a confluency measuring function. FIG. 11 illustrates tables as example of output information of the control device. Hereinafter, by referring to FIG. 4 to FIG. 11, the inspection method for inspecting the counting function of the imaging system 1 performed by executing the inspection program will be described.

The inspection performed by the imaging system 1 is performed by using the reference standard plates including the counting targets in advance in the known number and confluency. The size of the field of view of the imaging system 1 can be specified based on the imaging magnification of the imaging system 1. Thus, if the specifications of the reference standard plate such as the number and confluency of the counting targets included in the reference standard plate are known, it is also possible to specify the number of counting targets included in the image acquired by capturing the image of the reference standard plate. By utilizing that aspect, the imaging system 1 inspects the reliability of the counting function of the imaging system 1 by comparing the number of the counting targets counted by image analysis processing with the number of the counting targets specified based on the specifications of the reference standard plate and the setting of the imaging system 1. Further, the imaging system 1 may inspect the reliability of a confluency measuring function of the imaging system 1 by comparing the confluency of the counting targets measured by image analysis processing with the confluency of the counting targets specified based on the specifications of the reference standard plate.

More specifically, for an inspection, the imaging system 1 performs processing for capturing an image of the reference standard plate disposed in a vessel (step S1), processing for counting the counting targets included in the reference standard plate (step S2), and processing for outputting the acquired counted result (step S3) as illustrated in FIG. 4. Hereinafter, each of the steps from step S1 to step S3 will be described in more details.

In step S1, first, the inspector disposes a positioning jig 60 at a prescribed position on the stage 12 of the imaging device 10, and fixes it to the imaging device 10 via a screw or a positioning pin, for example, as illustrated in FIG. 5. As illustrated in FIG. 6, the positioning jig 60 includes a light-shielding part 63 and a transmission part 61 in a recessed shape with respect to the light-shielding part 63. The imaging device 10 may have a protrusion or an attachment hole formed in advance for positioning the jig.

After fixing the positioning jig 60, the inspector disposes two vessels (a vessel 200 and a vessel 300) on the transmission part 61. The vessel 200 is a vessel used for inspecting the counting function, and four reference standard plates (a reference standard plate 210, a reference standard plate 220, a reference standard plate 230, and a reference standard plate 240) are placed on the bottom face on the inner side of the vessel 200. The vessel 300 is a vessel used for inspecting the confluency measuring function, and a reference standard plate 310 is placed on the bottom face on the inner side of the vessel 300. Further, inside the vessel 200 and the vessel 300, a liquid such as water is filled from above the reference standard plates in order to have an environment close to the inside the vessel during culturing the cells. Note that as the vessel 200 and the vessel 300, vessels of a predetermined size such as a petri dish of 50 mm in diameter are used, for example. Thereby, the vessel 200 and the vessel 300 are supported by a support part 62 formed in the transmission part 61 and, as a result, fixed at a prescribed position with respect to the positioning jig 60 and thus at a prescribed position with respect to the imaging device 10. Note that it is also possible to prepare a vessel having a jig set in advance.

The reference standard plate 210 is a reference standard plate used for inspecting the counting function of the imaging system 1 that captures images of the phase objects and, as illustrated in FIG. 7, it has a structure in which a plurality of micro lenses are formed on a transparent flat plate. More specifically, as illustrated in FIG. 8, the reference standard plate 210 includes a base region 211 that is a part where the surface of the flat plate is exposed, and a plurality of counting target regions 212 that are parts where the micro lenses are formed on the flat plate. That is, each of the plurality of counting target regions 212 includes the micro lens.

The base region 211 and the counting target regions 212 are both made of an optical material such as glass or transparent plastics, for example. That is, the base region 211 and the counting target regions 212 are formed of a transparent phase object. Further, a thickness D1 of the base region 211 is different from a thickness D2 of the counting target regions 212. Thus, between the base region 211 and the counting target regions 212, the phase amounts in the thickness direction are different. Therefore, by capturing an image of the reference standard plate 210 using the phase-contrast observation method and the differential interference contrast observation method which visualize the phase contrast, it is possible to acquire the image with which the base region 211 and the counting target regions 212 can be identified. Further, with the bright-field observing method, it is also possible to acquire an image with which the base region 211 and the counting target regions 212 can be identified by emphasizing the contrast through stopping down an aperture stop. Further, since the micro lenses are in a three-dimensional shape projected with respect to the flat plate, it is also possible with the dark-field observing method and the oblique illumination observation method to acquire images with which the base region 211 and the counting target regions 212 can be identified.

Further, as illustrated in FIG. 9, the plurality of micro lenses are formed on the flat plate at specific intervals. The plurality of counting target regions 212 are regularly arranged within the reference standard plate 210, so that the number and confluency of the counting target regions 212 as the counting target are known. Thus, if the imaging magnification of the imaging system 1 is known, it is possible to specify the number of the counting target regions 212 positioned within the field of view regardless of what position on the reference standard plate 210 the field of view of the imaging system 1 is placed. Therefore, the number of the counting target regions 212 included in the image can be specified with sufficient precision and accuracy without analyzing the image. Precision means the extent indicating how small the variation among the measurements is, whereas accuracy means the extent indicating that the measurement value is close to the true value. Note that strictly speaking, the number of the counting target regions 212 may slightly fluctuate depending on the position of the field of view, but the range of fluctuation is known. Therefore, by having the known range of fluctuation as an allowable error, it is possible to inspect the reliability of the counting function.

Like the reference standard plate 210, the reference standard plate 220 to the reference standard plate 240 are the reference standard plates used for inspecting the counting function of the imaging system 1 that captures the images of the phase objects. The reference standard plate 220 to the reference standard plate 240 are different from the reference standard plate 210 in the respect that counting target regions in a size different from that of the counting target regions 212 are included therein. The reference standard plate 220 to the reference standard plate 240 are the same as the reference standard plate 210 in the other respects, specifically, in the respect that a plurality of micro lenses are formed on the flat plate, in the respect that the number and confluency of the counting target regions are known, and in the respect that it is possible to specify the number of counting target regions positioned within the field of view, for example.

The reference standard plate 310 is a reference standard plate used for inspecting the confluency measuring function of the imaging system 1 that captures the images of the phase objects and, as illustrated in FIG. 10, it includes two regions (a first region 311 and a second region 312) of different surface textures. The first region 311 and the second region 312 are both made of an optical material such as glass or transparent plastics, for example. That is, both are formed of a transparent phase object.

The first region 311 is the region outside the counting target, and corresponds to the base region 211 of the reference standard plate 210. In the meantime, the second region 312 is the counting target region, and corresponds to the counting target region 212 of the reference standard plate 210. Specifically, the first region 311 is a part having high flatness on the flat plate surface, for example. The second region 312 has unevenness formed by blasting, for example, and functions as a diffuser plate as a result.

The reference standard plate 310 includes the second region 312 of the known size so that, if the imaging magnification of the imaging system 1 is known, the area ratio of the second region 312 with respect to the field of view F is also known. Further, as long as the imaging processing is performed under a condition where the entire second region 312 comes within the field of view F, the area ratio can be uniquely determined from the imaging magnification regardless of what position of the reference standard plate 310 the field of view of the imaging system 1 is positioned. Therefore, it is possible to specify the area ratio (confluency) of the second region 312 included in the image with sufficient precision and accuracy without analyzing the image.

After fixing the vessel 200 and the vessel 300 on the positioning jig 60, the inspector disposes a light-shielding frame 70 on the positioning jig 60 to cover the transmission part 61 with the light-shielding frame 70 as illustrated in FIG. 5. Thereby, light from outside the imaging device 10 is prevented from making incident on the underneath of the stage 12, so that it is possible to secure the environment where the image of the reference standard plate can be captured under a specific condition without being affected by the external environment. This makes it possible to correctly evaluate the lighting condition using the light source 15 inside the imaging device 10. In addition, in the case of observation using the oblique illumination observation method, the illumination light may be reflected at the light-shielding frame 70.

After completing the preparation described heretofore, in step S1, the imaging device 10 captures the image of the reference standard plate according to an imaging instruction from the control device 30 by using any one selected from the phase-contrast observation method, the differential interference contrast observation method, the oblique illumination observation method, the bright-field observation method, and the dark-field observation method.

Specifically, the imaging device 10 captures images of the reference standard plate 210 to the reference standard plate 240 under a condition where the number of counting target regions positioned within the field of view of the imaging system 1 is specified. This condition includes that the plurality of counting target regions are regularly arranged within the reference standard plates, and that the imaging magnification of the imaging system is known. Further, the imaging device 10 captures an image of the reference standard plate 310 under a condition where the area ratio of the counting target region positioned within the field of view of the imaging system 1 is specified. This condition includes that the reference standard plate 310 is within the field of view, and that the imaging magnification of the imaging system is known. Thereafter, the imaging device 10 transmits the acquired images to the control device 30.

More specifically, the control device 30 moves the imaging unit 13 first to the underneath of the four reference standard plates in order within the vessel 200. After moving it, the control device 30 controls the imaging device 10 to execute the autofocus processing and imaging processing at each position. The imaging device 10 acquires a plurality of images of each of the reference standard plate 210, the reference standard plate 220, the reference standard plate 230, and the reference standard plate 240 by repeating such processing for a plurality of times (for example, ten times) without changing the imaging magnification, and transmits the acquired images to the control device 30. Further, the control device 30 moves the imaging unit 13 to the underneath of the reference standard plate 310 within the vessel 300. The control device 30 performs the autofocus processing and imaging processing at the moved position. At this time, the imaging device 10 acquires a plurality of images of the reference standard plate 310 by repeating the imaging processing for a plurality of times (for example, ten times) without changing the imaging magnification, and transmits the plurality of images to the control device 30.

When step S1 ends, the control device 30 analyzes the images received from the imaging device 10 to perform counting processing (step S2). Note that the control device 30 may perform the confluency measuring processing along with the counting processing in step S2.

Specifically, the control device 30 first analyzes each of the plurality of images of the reference standard plate 210 by using a learned model to count the counting target regions 212 included in each image. Note that the learned model is an example of the algorithm for counting the counting target regions included in the images. The control device 30 may count the counting target regions 212 by using an image processing algorithm other than machine learning. Further, the control device 30 calculates a mean (Mean) of a plurality of numbers acquired by the counting processing executed for a plurality of times, a standard deviation (Std deviation), a variable coefficient (CV), an error (Error Bound) of the mean with respect to the known number of counting target regions, and the like. Note here that the variable coefficient is a value acquired by dividing the standard deviation by the mean.

Thereafter, the control device 30 performs the same analysis for each of the plurality of images of the other reference standard plates (the reference standard plate 220 to the reference standard plate 240) while switching the learned model to be used for the analysis according to the size of the plurality of counting target regions included in each of the reference standard plates. That is, the counted result (mean) is acquired by counting the counting target regions, and further the evaluation results (the standard deviation, the variable coefficient, and the error) are calculated.

The control device 30 switches the learned model used for analysis from the model that counts the counting target regions to the model that measures the area of the counting target regions. Then, the control device 30 analyzes each of the plurality of images of the reference standard plate 310 by using the learned model for measuring the area of the counting target regions to measure the area ratio of the second region 312 occupying the image. Further, the control device 30 calculates the mean (Mean) of the plurality of acquired area ratios, the standard deviation (Std deviation), the variable coefficient (CV), the error (Error Bound) of the mean with respect to the known area ratio, and the like.

When step S2 ends, the control device 30 at last outputs the counted result as the result of the counting processing of step S2 (step S3), and ends the inspection processing illustrated in FIG. 4. Note that in step S3, the control device 30 may output, in addition to the counted result, the evaluation result of the counting function evaluated based at least on the counted result. Further, the control device 30 may output the confluency measured result along with the counted result, and further may output the evaluation result of the confluency measuring function evaluated based at least on the confluency measured result. That is, in step S3, the control device 30 may at least output the counted result.

Specifically, the control device 30 outputs a logfile including the information illustrated in a table T1 of FIG. 11 to a prescribed area of the auxiliary storage device 33. The control device 30 may further output a logfile including the information illustrated in a table T2 of FIG. 11 to a prescribed area of the auxiliary storage device 33.

The information illustrated in the table T1 includes the mean (Mean) of the number of the counting target regions, the standard deviation (Std deviation), the variable coefficient (CV), the error (Error Bound) of the mean with respect to the known number of counting target regions, and OK/NG for each of the reference standard plate 210 to the reference standard plate 240. Among those, the mean is the counted result itself. The standard deviation, the variable coefficient, the error, and OK/NG as the information other than the mean are the evaluation results of the counting function evaluated based at least on the counted result. Further, in more detailed classification, among the evaluation results of the counting function, the error is the evaluation result evaluated based on the counted result and the known number of counting target regions, and it is a first evaluation result regarding the accuracy of the count indicating how close the counted result is with respect to the true value. In the meantime, the standard deviation and the variable coefficient are the evaluation results evaluated based on the counted result, and those are second evaluation results regarding precision of the count indicating variation of the counted result. As described, the evaluation results of the counting function include the first evaluation result and the second evaluation results.

Further, OK/NG is a comprehensive evaluation regarding the reliability of the counting function of the imaging system 1. Note that "OK" indicates that the variable coefficient is within a prescribed range (for example, within 5%) and that the error is within a prescribed range (for example, within 20%), for example, and "NG" indicates that the condition described above is not satisfied, for example. Note that the conditions for determining "OK" and "NG" are not specifically limited to the example described above, but may be programed to be adjustable.

The information illustrated in the table T2 includes the mean (Mean) of the area ratios of the counting target regions, the standard deviation (Std deviation), the variable coefficient (CV), the error (Error Bound) of the mean with respect to the known area ratios of counting target regions, and OK/NG for the reference standard plate 310. Each of the items are the same as the information illustrated in the table T1.

After ending the inspection processing illustrated in FIG. 4, the inspector can check the reliability of the counting function and the confluency measuring function of the imaging system 1 by checking the information written in the logfile. The inspector may perform a reinspection by adjusting the lighting condition, when it is determined from the information written in the logfile that the reliability of each of the functions is not sufficient.

For example, when the result illustrated in FIG. 11 is acquired, it is confirmed that the imaging system 1 can bring out the reliable-level of measuring performance for the reference standard plate 210, the reference standard plate 220, and the reference standard plate 240. Thus, in the case of counting the phase objects in the size to which the reference standard plates correspond (that is, the size of the counting target regions included in the reference standard plates), it is possible to secure the reliability of the counting function of the imaging system 1 by the use of the imaging system 1 without changing the current setting.

In the meantime, it can be confirmed that the imaging system 1 cannot bring out the reliable-level of counting performance for the reference standard plate 230. In such a case, the inspector can search for the lighting condition where the imaging system 1 can bring out the reliable-level of counting performance for the reference standard plate 230 by further repeating the inspection while adjusting the lighting condition by changing the setting of the imaging system 1. Therefore, in the case of counting the phase objects in the size to which the reference standard plate 230 corresponds, it is possible to secure the reliability of the counting function of the imaging system 1 by the use of the imaging system 1 under the lighting condition specified by the search.

Note that in the case of employing the phase-contrast observation method or the differential interference contrast observation method, for example, the lighting condition can be adjusted by changing the position of the optical element disposed on the optical path. Further, in the case of employing the oblique illumination observation method or the dark-field observation method, for example, the lighting condition can be adjusted by changing the positional relation between the luminous light flux and the pupil. Furthermore, in the case of employing the bright-field observation method, for example, the lighting condition can be adjusted by changing the aperture diameter of the aperture stop.

As described above, with the imaging system 1, by inspecting the counting function with the inspection method illustrated in FIG. 4, it is possible to search for the lighting condition where the reliability of the counting function can be secured. Therefore, the user can utilize the imaging system 1 under an appropriate lighting condition, so that the reliability of the counting function of the imaging system 1 can be secured.

The lighting condition of the imaging system 1 is adjusted when the imaging system 1 cannot bring out the reliable-level of counting performance. For this adjustment, the information specifically indicating what is to be adjusted for improving the lighting condition with high possibility may be indicated to the inspector. The parameters to be changed, as described above, vary depending on the observation methods. In that case, the inspector can easily grasp what needs to be adjusted.

When an inspector such as a researcher who is not familiar with the configuration of the imaging device performs the inspection of the counting function with the above-described inspection method, the adjustment items of the lighting condition that can be adjusted by the inspector oneself are limited. Further, even if the inspector is familiar with the device configuration, there may also be a case where it is not possible to perform adjustment due to physical constraints. A specific example thereof may be a case where the lighting condition cannot be adjusted without the use of special tools. Therefore, the inspector may be reported by displaying whether the adjustment of the lighting condition can be done at the spot or the adjustment cannot be done without transporting the device to a factory. In that case, the inspector can appropriately determine whether or not the lighting condition can be changed by the inspector oneself.

While the case of the reference standard plate having a structure in which a plurality of micro lenses are formed on a transparent flat plate is described in the above-described embodiment, the configuration of the reference standard plate is not limited to that. For example, reference standard plates illustrated in FIG. 12 and FIG. 13 may be used to inspect the counting function.

Figure 12:
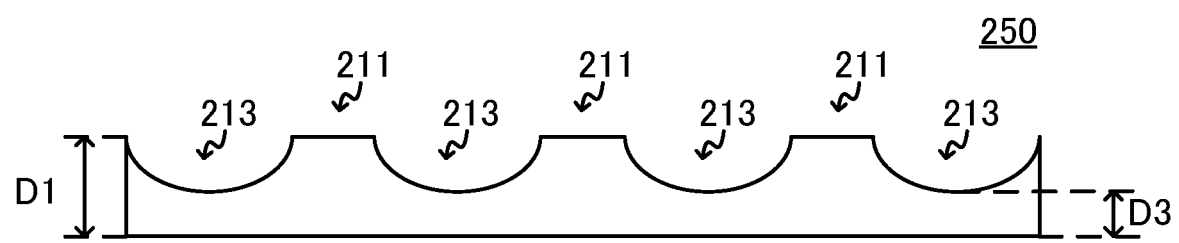
FIG. 12 is a schematic sectional view illustrating another example of the reference standard plate for inspecting the counting function.

FIG. 12 is a schematic sectional view illustrating another example of the reference standard plate for inspecting the counting function. A reference standard plate 250 illustrated in FIG. 12 is a reference standard plate used for inspecting the counting function of the imaging system 1 that captures an image of the phase object, and it is the same as the reference standard plate 210 in the respect that it has a structure in which a plurality of micro lenses are formed on a transparent flat plate. The reference standard plate 250 is different from the reference standard plate 210 in the respect that the micro lenses are formed not as convex lenses but as concave lenses. The reference standard plate 250 also includes the base region 211 that is a part where the surface of the flat plate is exposed, and a plurality of counting target regions 213 that are parts where the micro lenses are formed on the flat plate. Therefore, a thickness D3 of the counting target regions 213 is different from the thickness D1 of the base region 211, so that the phase amounts in the thickness direction are also different between the base region 211 and the counting target regions 213 as a result. Even in the case of inspecting the counting function by using the reference standard plate 250, it is also possible to secure the reliability of the counting function of the imaging system 1 as in the case of using the reference standard plate 210.

Figure 13:
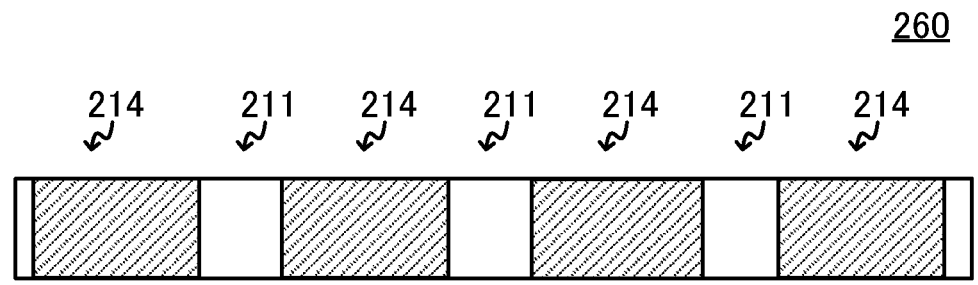
FIG. 13 is a schematic sectional view illustrating still another example of the reference standard plate for inspecting the counting function.

FIG. 13 is a schematic sectional view illustrating still another example of the reference standard plate for inspecting the counting function. A reference standard plate 260 illustrated in FIG. 13 is a reference standard plate used for inspecting the counting function of the imaging system 1 that captures an image of the phase object. The reference standard plate 260 is the same as the reference standard plate 210 in the respect that it includes the base region 211 and a plurality of counting target regions 214 that are different from the base region 211 in terms of the phase amount in the thickness direction. The reference standard plate 260 is different from the reference standard plate 210 in the respect that the base region 211 and the counting target regions 214 have different refractive indexes and, as a result, have different phase amounts in the thickness direction even though both are in the same thickness. Even in the case of inspecting the counting function by using the reference standard plate 260, it is also possible to secure the reliability of the counting function of the imaging system 1 as in the case of using the reference standard plate 210.

While the case of the reference standard plate in which a plurality of counting target regions are arranged in a square lattice form is described in the above-described embodiment, the layout of the plurality of counting target regions is not limited to that. For example, reference standard plates illustrated in FIG. 14 and FIG. 15 may be used to inspect the counting function.

FIG. 14 is a schematic top view illustrating another example of the reference standard plate for inspecting the counting function. A reference standard plate 270 illustrated in FIG. 14 is a reference standard plate used for inspecting the counting function of the imaging system 1 that captures an image of the phase object, and it is the same as the reference standard plate 210 in the respect that it has a structure in which a plurality of micro lenses are formed on a transparent flat plate. The reference standard plate 270 is different from the reference standard plate 210 in the respect that the plurality of counting target regions 212 are not arranged in a square lattice form but arranged in a hexagonal lattice form. As long as the plurality of counting target regions 212 are regularly arranged, the number of counting target regions 212 positioned within the field of view can be specified. Therefore, even in the case of inspecting the counting function by using the reference standard plate 270, it is also possible to secure the reliability of the counting function of the imaging system 1 as in the case of using the reference standard plate 210.

Figure 15:
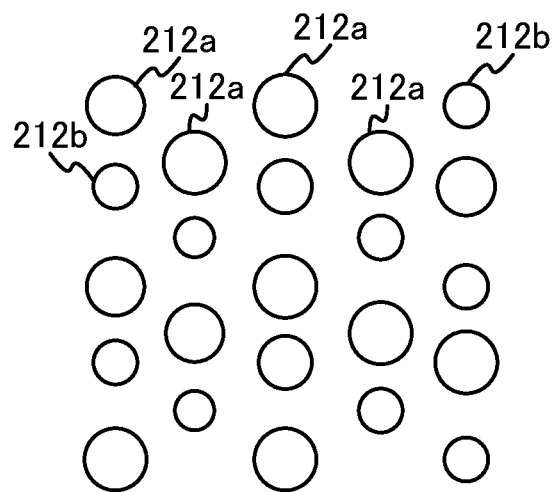
FIG. 15 is a schematic top view illustrating still another example of the reference standard plate for inspecting the counting function.

FIG. 15 is a schematic top view illustrating still another example of the reference standard plate for inspecting the counting function. A reference standard plate 280 illustrated in FIG. 15 is a reference standard plate used for inspecting the counting function of the imaging system 1 that captures an image of the phase object, and it is the same as the reference standard plate 270 in the respect that a plurality of counting target regions (counting target regions 212a and counting target regions 212b) are arranged in a hexagonal lattice form. The reference standard plate 280 is different from the reference standard plate 270 in the respect that the plurality of the counting target regions are not in the same size but the counting target regions 212a and the counting target regions 212b in different sizes are included. As long as the learned model corresponds to the sizes of the counting target regions 212a and the counting target regions 212b, even in the case of inspecting the counting function by using the reference standard plate 280, it is also possible to secure the reliability of the counting function of the imaging system 1 as in the case of using the reference standard plate 210. While the case with two different sizes of counting target regions is described, there may also be three or more different sizes of counting target regions.

Figure 16:
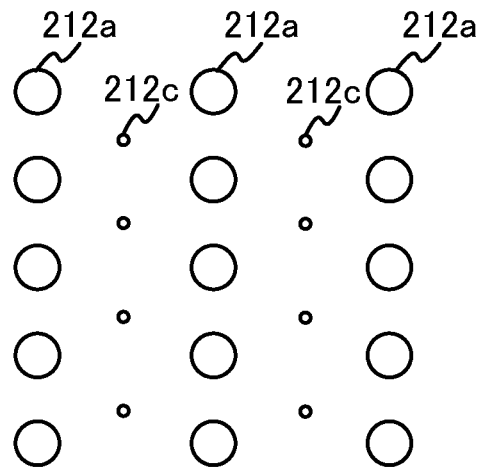
FIG. 16 is a schematic top view illustrating a further example of the reference standard plate for inspecting the counting function.

FIG. 16 is a schematic top view illustrating a further example of the reference standard plate for inspecting the counting function. A reference standard plate 290 illustrated in FIG. 16 is a reference standard plate used for inspecting the counting function of the imaging system 1 that captures an image of the phase object, and it is the reference standard plate in which a plurality of counting target regions 212a and a plurality of uncounted regions 212c are arranged in a hexagonal lattice form. The counting target regions 212a are formed in a size similar to the size of cells that are counted in the actual observation, while the uncounted regions 212c are formed in a size close to the size of microstructure such as dust that is not supposed to be counted. Even in the case of using the reference standard plate 290, it is also possible to secure the reliability of the counting function of the imaging system 1. Especially, by inspecting the counting function by using the reference standard plate 290, it is also possible to simultaneously inspect appropriateness of the learned model, for example, whether or not the learned model is appropriate for counting only the right targets without mistakenly counting dust and the like, along with inspecting appropriateness of the setting of the imaging device 10 such as the lighting condition.

While the cases where a plurality of counting target regions are regularly arranged are described in the above-described embodiment, the plurality of counting target regions may not necessarily need to be regularly arranged as long as the number of counting target regions within the field of view can be specified. For example, a reference standard plate illustrated in FIG. 17 may be used to inspect the counting function.

FIG. 17 is a schematic top view illustrating a still further example of the reference standard plate for inspecting the counting function. A reference standard plate 295 illustrated in FIG. 17 is a reference standard plate used for inspecting the counting function of the imaging system 1 that captures an image of the phase object. The reference standard plate 295 is different from the reference standard plate 210 in the respect that it includes a plurality of counting target regions 212 arranged irregularly and a positioning mark M. Further, in the reference standard plate 295, the number of counting target regions 212 positioned within the field of view when the positioning mark M is aligned at a prescribed position of the field of view such as at an upper left corner of the field of view, for example, is specified in advance for each imaging magnification. Therefore, even in the case of using the reference standard plate 295, the imaging device 10 can capture images of the reference standard plate 295 under a condition where the number of counting target regions positioned within the field of view of the imaging system 1 is specified. This condition includes that the reference standard plate 295 is disposed at a prescribed position with respect to the field of view and that the imaging magnification of the imaging system 1 is known. Therefore, even in the case of using the reference standard plate 295, it is also possible to secure the reliability of the counting function of the imaging system 1.

The above-described embodiment provides specific examples for making it easy to understand the present invention, but the embodiment of the present invention is not limited thereto. Various modifications and changes of the inspection method, the computer-readable recording medium, and the reference standard plate are possible without departing from the scope of the appended claims.

While the case of configuring the counting target regions by using the micro lenses is described in the above-described embodiment, the shape of the micro lenses is not specifically limited. The lens shape may be spherical or aspherical. Further, the lens shape is not limited to an isotropic shape but may also be an anisotropic shape such as a cylindrical lens. However, with the isotropic lens shape, the counted result does not depend on the lighting direction. Thus, the isotropic lens shape is desirable in the respect that there is no restriction in the direction of the reference standard plate at the time of inspection. Further, the concavo-convex shape is also desirable in the respect that it is easy to have shading especially when the oblique illumination observation method is used so that the lighting condition can be easily checked with visual inspection.

The counting target region may be the region that has a phase amount in the thickness direction different from that of the base region, that is, may be the region having a different optical path length. Thus, instead of the micro lens, the counting target region may include an arbitrary imaging phantom that can be used as biological samples imitating cells and tissues, for example.

The above-described inspection method can be performed at any timing. However, it is desirable for the inspection method to be performed at the factory before shipping the imaging system 1, and more desirable to be performed at the spot where the shipped imaging system 1 is used. This makes it possible to guarantee the reliability of the counting function of the delivered imaging system 1 for the user of the imaging system 1.

While the case where the reference standard plate is formed of an optical material is described in the above-described embodiment, the material is not limited to the optical material as long as the phase amount thereof can be set. However, since the reference standard plate is the standard for evaluating the reliability of the counting function, it is desirable for the material thereof not to be easily deformed and to have the property that is not easily deteriorated.

Figure 18:
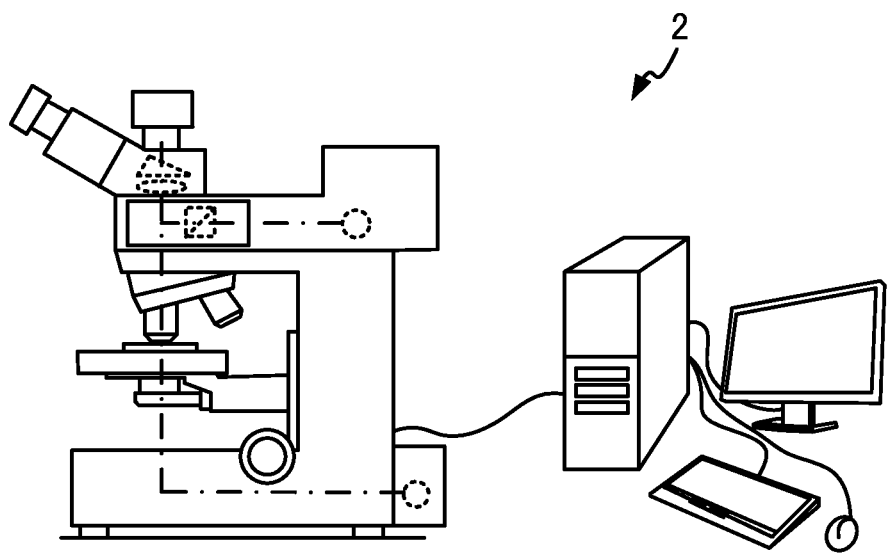
FIG. 18 is a diagram illustrating an example of a configuration of a microscope system.

While the case of the imaging system 1 in which the imaging device 10 is used by being placed inside the incubator 20 is described in the above-described embodiment, the imaging device 10 of the imaging system is not limited to the device used inside the incubator. The imaging device 10 of the imaging system may be a device used within a work space such as a clean bench. The imaging system 1 may be a regular microscope system 2 as illustrated in FIG. 18, for example.

What is claimed is:

1. An inspection method of an imaging system, the inspection method comprising:
   capturing, by an image sensor of the imaging system, an image of a reference standard plate,
     wherein the reference standard plate comprises a base region and a plurality of counting target regions regularly arranged on the base region, the plurality of counting target regions having a phase amount in a thickness direction different from a phase amount of the base region, and
     wherein a known number of counting target regions among the plurality of counting target regions is positioned within a field of view of the image sensor of the imaging system;
   performing, by a processor of the imaging system, a counting function of counting a number of counting target regions included in the image of the reference standard plate;
   performing, by the processor, a comparison of the number of counting target regions included in the image of the reference standard plate and the known number of counting target regions positioned within the field of view of the imaging system; and
   determining, by the processor, a reliability of the counting function based on a result of the comparison.

2. The inspection method according to claim 1, wherein determining the reliability of the counting function comprises determining, by the processor, a first evaluation result regarding accuracy of count based on a result of the counting function and the known number of counting target regions.

3. The inspection method according to claim 1, wherein determining the reliability of the counting function comprises determining, by the processor, a second evaluation result regarding precision of count based on a result of the counting function.

4. The inspection method according to claim 2, wherein determining the reliability of the counting function comprises determining, by the processor, a second evaluation result regarding precision of count based on a result of the counting function.

5. The inspection method according to claim 1, wherein capturing the image of the reference standard plate comprises capturing, by the image sensor, the image of the reference standard plate where an imaging magnification of the image sensor is known.

6. The inspection method according to claim 2, wherein capturing the image of the reference standard plate comprises capturing, by the image sensor, the image of the reference standard plate where an imaging magnification of the image sensor is known.

7. The inspection method according to claim 3, wherein capturing the image of the reference standard plate comprises capturing, by the image sensor, the image of the reference standard plate where an imaging magnification of the image sensor is known.

8. The inspection method according to claim 4, wherein capturing the image of the reference standard plate comprises capturing, by the image sensor, the image of the reference standard plate where an imaging magnification of the image sensor is known.

9. The inspection method according to claim 1, wherein capturing the image of the reference standard plate comprises capturing the image of the reference standard plate disposed at a prescribed position with respect to the field of view where an imaging magnification of the image sensor is known.

10. The inspection method according to claim 1, wherein each of the plurality of counting target regions has a thickness different from a thickness of the base region.

11. The inspection method according to claim 10, wherein the each of the plurality of counting target regions includes a micro lens.

12. The inspection method according to claim 1, wherein each of the plurality of counting target regions has a refractive index different from a refractive index of the base region.

13. The inspection method according to claim 1, wherein capturing the image of the reference standard plate comprises capturing, by the imaging sensor, the image of the reference standard plate by using any one of a phase-contrast observation method, a differential interference contrast observation method, an oblique illumination observation method, a bright-field observation method, and a dark-field observation method.

14. The inspection method according to claim 13, wherein performing the counting function comprises changing an algorithm for counting the number of counting target regions included in the image according to a size of the plurality of counting target regions.

15. The inspection method according to claim 1, wherein:
the base region is formed of a phase object; and
the plurality of counting target regions are formed of phase objects.

16. A non-transitory computer-readable recording medium recording a program for inspecting a counting function of an imaging system, wherein the program causes a computer of the imaging system to at least perform:
causing an image sensor of the imaging system to capture an image of a reference standard plate,
wherein the reference standard plate comprises a base region and a plurality of counting target regions regularly arranged on the base region, the plurality of counting target regions having a phase amount in a thickness direction different from a phase amount of the base region, and
wherein a known number of counting target regions among the plurality of counting target regions is positioned within a field of view of the image sensor of the imaging system;
performing a counting function of counting a number of counting target regions included in the image of the reference standard plate;
performing a comparison of the number of counting target regions included in the image of the reference standard plate and the known number of counting target regions positioned within the field of view of the imaging system; and
determining a reliability of the counting function based on a result of the comparison.

* * * * *